(12) United States Patent
Solis

(10) Patent No.: US 10,067,948 B2
(45) Date of Patent: Sep. 4, 2018

(54) DATA DEDUPING IN CONTENT CENTRIC NETWORKING MANIFESTS

(71) Applicant: CISCO TECHNOLOGY, INC., San Jose, CA (US)

(72) Inventor: Ignacio Solis, Scotts Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 314 days.

(21) Appl. No.: 15/074,870

(22) Filed: Mar. 18, 2016

(65) Prior Publication Data

US 2017/0270134 A1    Sep. 21, 2017

(51) Int. Cl.
| | | |
|---|---|---|
| G06F 17/30 | (2006.01) | |
| H04L 29/08 | (2006.01) | |
| G06F 3/06 | (2006.01) | |

(52) U.S. Cl.
CPC ........ G06F 17/30159 (2013.01); G06F 3/067 (2013.01); G06F 3/0608 (2013.01); G06F 3/0641 (2013.01); G06F 17/30097 (2013.01); H04L 67/1097 (2013.01); H04L 67/327 (2013.01)

(58) Field of Classification Search
CPC ........ G06F 17/30159; G06F 17/30097; G06F 3/0608; G06F 3/0641; G06F 3/067; H04L 67/1097; H04L 67/327
USPC ........................................ 707/692
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |

(Continued)

FOREIGN PATENT DOCUMENTS

| | | |
|---|---|---|
| CN | 103873371 | 6/2014 |
| DE | 1720277 A1 | 6/1967 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

(Continued)

*Primary Examiner* — Thanh-Ha Dang

(57) ABSTRACT

A storage system facilitates deduping repeating data segments when generating a Manifest hierarchy for a file. During operation, the system can select a partitioning function that identifies a pattern that is expected to occur a predetermined number of times within the file. The system can process a plurality of segments of the file, using the partitioning function, to identify a set of chunk boundaries. The system generates a chunk for each file portion between two consecutive chunk boundaries, and generates a Manifest that includes a Content Object Hash (COH) value for each partitioned chunk. The system can store the Manifest and the unique partitioned chunks in a storage repository, such that two partitioned chunks with a common COH value are stored once in the storage repository.

20 Claims, 10 Drawing Sheets

(56) References Cited

U.S. PATENT DOCUMENTS

| | | |
|---|---|---|
| 5,506,844 A | 4/1996 | Rao |
| 5,629,370 A | 5/1997 | Freidzon |
| 5,649,109 A | 7/1997 | Griesmer |
| 5,845,207 A | 12/1998 | Amin |
| 5,870,605 A | 2/1999 | Bracho |
| 6,021,464 A | 2/2000 | Yao |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,182,133 B1 | 1/2001 | Horvitz |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,947 B1 | 4/2002 | Kavner |
| 6,366,988 B1 | 4/2002 | Skiba |
| 6,957,228 B1 | 3/2003 | Horvitz |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,834,272 B1 | 12/2004 | Naor |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,233,948 B1 | 6/2007 | Shamoon |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,426,696 B1 | 9/2008 | Hwang |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,535,926 B1 | 5/2009 | Deshpande |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 * | 12/2009 | Lev-Ran ............... H04L 51/063 709/218 |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,711,684 B2 | 5/2010 | Sundaresan |
| 7,747,749 B1 | 6/2010 | Erickson et al. |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,814,425 B1 | 10/2010 | O'Shaugnessy |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,239,331 B2 | 8/2012 | Shanmugavelayutham |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,375,420 B2 | 2/2013 | Farrell |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,688,727 B1 | 4/2014 | Das |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,863,227 B2 | 10/2014 | Zhang |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |

(56) References Cited

U.S. PATENT DOCUMENTS

| | | |
|---|---|---|
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,009,465 B2 | 4/2015 | Zhang |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 9,380,326 B1 | 6/2016 | Corley |
| 9,400,852 B2 | 7/2016 | Kim |
| 2001/0051927 A1 | 12/2001 | London |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0049541 A1 | 3/2004 | Swahn |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2004/0267902 A1 | 12/2004 | Yang |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0066121 A1 | 3/2005 | Keeler |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2009/0287853 A1 | 10/2005 | Graser |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0248078 A1 | 11/2006 | Gross |
| 2006/0256767 A1 | 11/2006 | Suzuki |
| 2006/0268792 A1 | 11/2006 | Belcea |
| 2006/0288237 A1 | 12/2006 | Goodwill |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0156998 A1 | 7/2007 | Gorobets |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082509 A1 | 4/2008 | Bessieres |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123536 A1 | 5/2008 | Johnson |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0244460 A1 | 10/2008 | Louch |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |

(56) References Cited

U.S. PATENT DOCUMENTS

| | | |
|---|---|---|
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0204636 A1* | 8/2009 | Li ............... G06F 17/30097 |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2012/0166433 A1 | 11/2009 | Carson |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307286 A1 | 12/2009 | Laffin |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0316052 A1 | 12/2010 | Petersen |
| 2010/0322249 A1 | 12/2010 | Thathapudi |
| 2010/0332595 A1 | 12/2010 | Fullagar |
| 2011/0010498 A1* | 1/2011 | Lay ............... G06F 11/1453 |
| | | 711/115 |
| 2011/0013637 A1 | 1/2011 | Xue |
| 2011/0019674 A1 | 1/2011 | Iovanna |
| 2011/0022812 A1 | 1/2011 | vanderlinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0079056 A1 | 3/2012 | Turanyi et al. |
| 2012/0102136 A1 | 4/2012 | Srebrny |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0124046 A1* | 5/2012 | Provenzano ........ G06F 3/0605 |
| | | 707/737 |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0143715 A1* | 6/2012 | Eshghi ............ G06F 17/30159 |
| | | 705/26.3 |
| 2012/0155464 A1 | 6/2012 | Kim |
| 2012/0158912 A1 | 6/2012 | Jacobson |
| 2012/0158973 A1 | 6/2012 | Jacobson |
| 2012/0163373 A1 | 6/2012 | Lo |

(56) References Cited

U.S. PATENT DOCUMENTS

| | | |
|---|---|---|
| 2012/0166806 A1 | 6/2012 | Zhang |
| 2014/0122587 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0237028 A1 | 9/2012 | Khazan |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0317655 A1 | 12/2012 | Zhang |
| 2012/0322422 A1 | 12/2012 | Frecks |
| 2012/0323933 A1 | 12/2012 | He |
| 2012/0331112 A1 | 12/2012 | Chatani |
| 2013/0016695 A1 | 1/2013 | Ravindran |
| 2013/0024560 A1 | 1/2013 | Vasseur |
| 2013/0039249 A1 | 2/2013 | Ravindran |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091237 A1 | 4/2013 | Ambalavanar |
| 2013/0091539 A1 | 4/2013 | Khurana |
| 2013/0110781 A1 | 5/2013 | Golab |
| 2013/0110987 A1 | 5/2013 | Kim |
| 2013/0111063 A1 | 5/2013 | Lee |
| 2013/0121489 A1 | 5/2013 | Pestoni |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0163758 A1 | 6/2013 | Viswanathan |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0258878 A1 | 10/2013 | Wakikawa |
| 2013/0262365 A1 | 10/2013 | Dolbear |
| 2013/0262698 A1 | 10/2013 | Schwan |
| 2013/0275544 A1 | 10/2013 | Westphal |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332955 A1 | 12/2013 | Hong |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2013/0346877 A1 | 12/2013 | Borovoy |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0023076 A1 | 1/2014 | Calo |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0090761 A1 | 4/2014 | Foucher |
| 2014/0096249 A1 | 4/2014 | Dupont |
| 2014/0096269 A1 | 4/2014 | Amidei |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0129690 A1 | 5/2014 | Jaisinghani |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | dekozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2003/0046421 A1 | 8/2014 | Bevilacqua-Linn |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0036535 A1 | 2/2015 | Mosko |
| 2015/0039890 A1 | 2/2015 | Khosravi |
| 2015/0063802 A1 | 3/2015 | Bahadur |

(56) References Cited

U.S. PATENT DOCUMENTS

| | | | |
|---|---|---|---|
| 2015/0089081 A1 | 3/2015 | Thubert | |
| 2015/0095481 A1 | 4/2015 | Ohnishi | |
| 2015/0095514 A1 | 4/2015 | Yu | |
| 2015/0117253 A1 | 4/2015 | Scott | |
| 2015/0120663 A1 | 4/2015 | LeScouarnec | |
| 2015/0169758 A1 | 6/2015 | Assom | |
| 2015/0188770 A1 | 7/2015 | Naiksatam | |
| 2015/0195149 A1 | 7/2015 | Vasseur | |
| 2015/0207633 A1 | 7/2015 | Ravindran | |
| 2015/0207864 A1 | 7/2015 | Wilson | |
| 2015/0222424 A1 | 8/2015 | Mosko | |
| 2015/0270957 A1 | 9/2015 | Uzun | |
| 2015/0279348 A1 | 10/2015 | Cao | |
| 2015/0281071 A1 | 10/2015 | Mosko | |
| 2015/0288755 A1 | 10/2015 | Mosko | |
| 2015/0312300 A1 | 10/2015 | Mosko | |
| 2015/0349961 A1 | 12/2015 | Mosko | |
| 2015/0372903 A1 | 12/2015 | Hui | |
| 2015/0381546 A1 | 12/2015 | Mahadevan | |
| 2016/0014027 A1 | 1/2016 | Oran | |
| 2016/0019275 A1 | 1/2016 | Mosko | |
| 2016/0021170 A1* | 1/2016 | Mosko | G06F 17/3089 709/217 |
| 2016/0021172 A1 | 1/2016 | Mahadevan | |
| 2016/0062840 A1 | 3/2016 | Scott | |
| 2016/0110466 A1 | 4/2016 | Uzun | |
| 2016/0149913 A1 | 5/2016 | Eriksson | |
| 2016/0162368 A1* | 6/2016 | Slater | G06F 17/30156 707/692 |
| 2016/0171184 A1 | 6/2016 | Solis | |
| 2016/0173604 A1 | 6/2016 | Panigrahi | |
| 2017/0353514 A1* | 12/2017 | Mosko | H04L 67/327 |
| 2018/0095987 A1* | 4/2018 | Anderson | G06F 17/30067 |

FOREIGN PATENT DOCUMENTS

| | | |
|---|---|---|
| DE | 19620817 A1 | 11/1997 |
| EP | 0295727 2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |
| EP | 2562978 | 10/2014 |
| EP | 2975825 A1 | 1/2016 |
| EP | 2978191 A1 | 1/2016 |
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2005041527 | 5/2005 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2011159715 | 12/2011 |
| WO | 2012077073 A1 | 6/2012 |
| WO | 2013123410 | 8/2013 |
| WO | 2014023072 | 2/2014 |
| WO | 2014090761 | 6/2014 |
| WO | 2014102371 | 7/2014 |
| WO | 2015084327 | 6/2015 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network &oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/.downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

"PBC Library-Pairing-Based Cryptography-About," http://crypto.stanford.edu/pbc. downloaded Apr. 27, 2015.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heal pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004.

(56) References Cited

OTHER PUBLICATIONS

Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {AUg. 2013). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Saha!, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust man-

(56) References Cited

OTHER PUBLICATIONS agement approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "Easier: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.

(56) References Cited

OTHER PUBLICATIONS

W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
International Search Report and Written Opinion in corresponding International Application No. PCT/US2017/022346, dated Jun. 22, 2017, 9 pages.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* * figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* *Section 4.1; p. 4, col. 2* *Section 4.2; p. 4, col. 2.
Priya Mahadevan et al. "CCN-KRS", Proceedings of the 1st International Conference on Information-Centric Networking, Inc. '14, Sep. 24, 2014.
Flavio Roberto Santos Et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *The Whole Document*.
Sun et al.: "Content-Based Route Lookup Using CAMs", Global Communications Conference, IEEE, Dec. 3, 2012 *The Whole Document*.

(56) References Cited

OTHER PUBLICATIONS

Gelenbe et al.: "Networks With Cognitive Packets", Modeling, Analysis and Simulation of Computer and Telecommunication Systems, 2000. IEEE, Aug. 29, 2000, pp. 3-10.
Vangelis et al.: "On the Role of Semantic Descriptions for Adaptable Protocol Stacks in the Internet of Things", 2014 28th International Conference on Advanced Information Networking and Applications Workshops, IEEE, May 13, 2014, pp. 437-443, *last paragraph of section II.B*.
Smetters et al. "Securing Network Content" Technical Report, PARC TR-2009-1, Oct. 1 2009, Retrieved from the internet URL:http//www.parc.com/content/attachments/TR-2009-01.pdf [retrieved Nov. 1, 2016].
Marc Mosko "CCNx Label Forwarding (CCNLF)" Jul. 21, 2014.
Gallo Alcatel-Lucent Bell Labs "Content-Centric Networking Packet Header Format" Jan. 26, 2015.
Huard J-F et al. "A Programmable Transport Architecture with QOS Guarantees" IEEE Communications Magazine, vol. 36, No. 10, Oct. 1, 1998.
Microsoft Computer Dictionary, Fifth Edition, 2002, Microsoft Press, p. 23.
Mind—A Brief Introduction, John R. Searle, 2004, Oxford University Press, pp. 62-67.
J.J. Garcia-Luna-Aceves "Name-Based Content Routing in Information Centric Networks Using Distance Information", Proceedings of the 1st International Conference on Information-Centric Networking, Inc '14, Sep. 24, 2014, pp. 7-16, *p. 10, left-hand column, first paragraph*.
Lan Wang et al.: "OSPFN: An OSPF Based Routing Protocol for Named Data Networking", Jul. 25, 2012, URL: http://new.named-data.net/wp-content/uploads/TROSPFN.pdf [Retreived on Jul. 25, 2012], *section 3.1; p. 4*.

* cited by examiner

DATA DEDUPING IN CONTENT CENTRIC NETWORKING MANIFESTS

BACKGROUND

Field

This disclosure is generally related to a content centric network (CCN). More specifically, this disclosure is related to deduping portions of a data block when generating a Manifest hierarchy for the data block.

Related Art

The proliferation of the Internet and e-commerce continues to fuel revolutionary changes in the network industry. Today, a significant number of information exchanges, from online movie streaming to daily news delivery, retail sales, and instant messaging, are conducted online. An increasing number of Internet applications are also becoming mobile. However, the current Internet operates on a largely location-based addressing scheme. The most ubiquitous protocol, the Internet Protocol (IP), is based on location-based address. That is, a consumer of content can only receive the content by explicitly requesting the content from an address (e.g., IP address) closely associated with a physical object or location. A request that has a URL with an IP address for a specific organization causes the request to go to that organization's servers and not to those of another organization.

Recently, content centric networking (CCN) architectures have been proposed in the industry. CCN brings a new approach to content transport. Instead of having network traffic viewed at the application level as end-to-end connections over which content travels, content is requested or returned based on its unique name, and the network is responsible for routing content from the provider to the consumer.

With content centric networks, an Interest message includes a name for a Content Object, and a client can disseminate the Interest over CCN to obtain the Content Object from any CCN node that hosts the Content Object. The Interest is forwarded toward a CCN node that advertises at least a prefix of the Interest's name. If this CCN node can provide the Content Object, this node can return the Content Object (along the Interest's reverse path) to satisfy the Interest.

Publishers oftentimes want to replicate their content across various host servers. They can partition their content into a set of chunks, and can use one or more Manifests to reference the collection of Content Objects that include the chunks that make up the content. They can store the Manifests and the Content Objects across one or more host servers, allowing consumers to obtain the Manifests and Content Objects from any of the host servers.

Manifests sometimes help reduce the amount of data stored on a server by storing a Content Object once, even when referenced multiple times by one or more Manifests. For example, if two or more chunks partitioned from a file include the same data, the Manifests can store the repeating data in one Content Object. This Content Object can be referenced multiple times in the Manifests. However, a typical algorithm for generating the Manifests breaks up the content into chunks of a predetermined size. The repeating data segments may not always be aligned with the fixed-size chunks, which makes it difficult to dedupe repeating data from a file.

SUMMARY

One embodiment provides a storage system that facilitates deduping data segments that repeat in a data block (e.g., a file) when generating a Manifest hierarchy for the data block. During operation, the system can select a partitioning function that identifies a pattern that is expected to occur a predetermined number of times within the data block. The system can use the partitioning function to process a plurality of segments of the data block to identify the chunk boundaries. The system generates a chunk for each portion of the data block between two consecutive chunk boundaries, and generates a Manifest that includes a Content Object Hash (COH) value for each partitioned chunk. The system can store the Manifest and the unique partitioned chunks in a storage repository, such that two partitioned chunks with a common COH value are stored once in the storage repository.

In information centric networks (ICN), each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in an CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338, 175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, the partitioning function can take as input a segment $s_i$ consisting of m consecutive bytes, such that segment $s_i$ starts at the $i^{th}$ byte of the data block. Moreover, while identifying the chunk boundaries, the system can process a respective segment $s_i$ to obtain an n-bit identifier which has an expected repetition period in the data block approximately equal to a target chunk size, and determines whether the n-bit pattern matches a predetermined boundary indicator.

In some variations on these embodiments, while processing the segment $S_i$, the system can apply a mask M to segment $s_i$ to mask all but the n least significant bits of segment $s_i$.

In some variations on these embodiments, while processing the segment $s_i$, the system can compute a hash value $h(s_i)$, and obtaining the last n bits of the computed hash value.

In some embodiments, while storing a respective chunk in the storage repository, if the system determines that the respective chunk is smaller than or equal to a predetermined size, the system generates a nameless Content Object that includes the respective chunk. The system can store the nameless Content Object in the data repository, if the nameless Content Object does not exist in the data repository.

In some embodiments, while storing a respective chunk in the storage repository, if the system determines that the respective chunk is larger than a predetermined size, the system selects a second partitioning function that identifies a second pattern that is expected to occur a second predetermined number of times within the chunk. The system then uses the second partitioning function to partition the chunk into a collection of sub-chunks, and generates a second Manifest that includes a Content Object Hash (COH) value for each partitioned sub-chunk. The system may then store the second Manifest and the unique sub-chunks that do not exist in the storage repository.

In some embodiments, the data block can correspond to a file in a filesystem. When the system detects that the file has been modified, the system can determine a portion of the file that has been modified, determines a nameless Content Object affected by the modification to the file, and generates one or more new nameless Content Objects that include the modification to the file and are to replace the affected Content Object. The system then stores the one or more nameless Content Objects in the storage repository. The system can modify a Manifest hierarchy that corresponds to the file to realize the modification by updating, in one or more Manifests of the Manifest hierarchy, COH values corresponding to the modified portion of the file to replace the affected Content Object with the new nameless Content Objects, at the modified portion of the file.

BRIEF DESCRIPTION OF THE FIGURES

In the figures, like reference numerals refer to the same figure elements.

DETAILED DESCRIPTION

Figure 1:
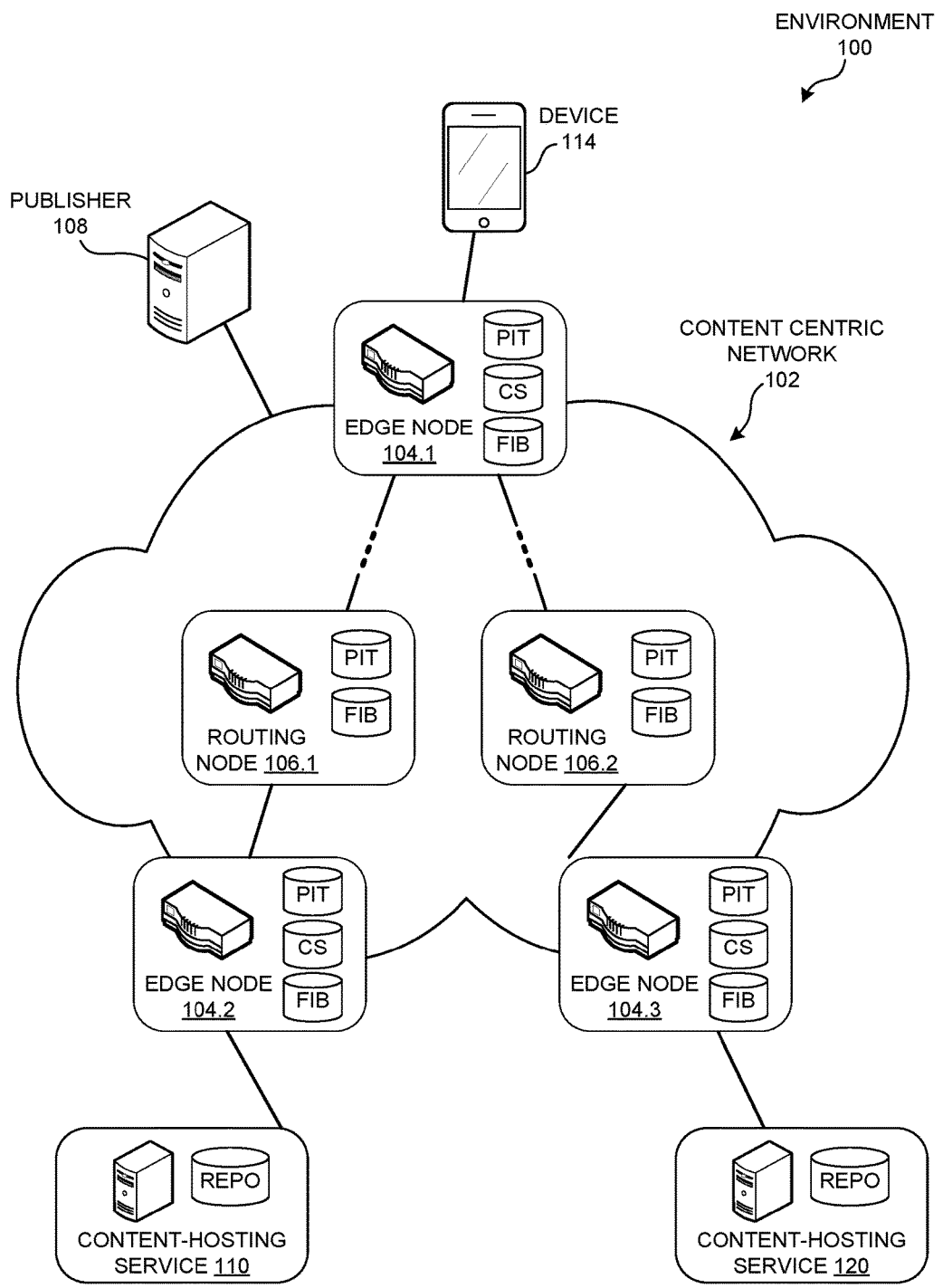
FIG. 1 illustrates an exemplary network environment that facilitates hosting a deduped collection of Content Objects that make up a file across a plurality of content-hosting services in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a data-deduping system that solves the problem of reducing the amount of data that needs to be stored or transmitted over a Content Centric Network for a large file that has repeating data segments. The system can dedupe segments that repeat in a file, regardless of how these repeating segments are aligned in the file, by searching for partitioning points in the file that have a given pattern.

In some embodiments, the system can generate a Manifest tree in a way that increases the number of repeating chunks that are deduped from the file. To do this, the system can detect file locations where certain bit patterns exist in the file, and can partition the file into chunks that are aligned with these bit patterns. These partitioning points (hereinafter referred to as "chunk boundaries") are detected by feeding segments of the file into a function that computes a byte pattern that is compared against a predetermined pattern. In its simplest form, the function may simply return the n-length byte patterns within the file, so that the chunk boundaries occur at file locations that contain the predetermined pattern. In some other embodiments, the function can compute a running hash for a segment of the file, and returns this running hash value as the pattern. This can provide additional flexibility, as the function can identify chunk boundaries even when the predetermined pattern does not occur within the file.

As a result, the system does not need to search for repeating patterns before partitioning the file into unique chunks, as is oftentimes done by compression algorithms. By partitioning the file into smaller chunks at each instance of a given byte pattern, the system can partition the file in a way that automatically isolates certain repeating patterns.

Given that using a search pattern to delineate the chunk boundaries results in non-periodic chunk boundaries, not all chunks produced from a file will have the same byte size. Some chunks will be larger than others, but on average the expected chunk size can be predicted from the size of the search pattern (hereinafter also referred to as a "boundary indicator"). For example, searching for a given one-byte pattern can produce chunks with an expected size of 256 bytes, and searching for a pattern with n bytes can result in an expected chunk size of $256^n$. Hence, the size of the boundary indicator can be increased to produce chunks with a larger expected size.

The system can create one Content Object for each unique chunk between consecutive partitioning points, and can create a Manifest hierarchy that lists the named Content Objects that make up the file. Listing the Content Objects in a Manifests can provide some degree of deduping by allowing a Content Object to be stored once, and allowing one or more Manifests to reference the same Content Object multiple times.

In some other embodiments, the Content Objects and Manifests can be nameless objects that are referenced by their hash values. This allows the client device to obtain the Content Object or Manifest by generating an Interest that includes a name prefix of any publisher or replica server that is hosting the collection, and includes a ContentObjectHash restriction that includes the hash of the nameless object. Hence, a Manifest for a collection of nameless objects can include a list of the ContentObjectHash (COH) values that are to be used in the Interests' COH restrictions, without having to specify location-independent names (e.g., HSV-LIs) for the individual objects in the collection.

A root Manifests can list the location-independent name for the file (or a name prefix for a publisher hosting the file), along with the COH values for these Content Objects and Manifests. The root Manifest can also include a signature for the file (or data collection), signed by its publisher. Once a consumer obtains the root Manifest and validates the root Manifest using the signature, the consumer can retrieve the collection of Content Objects listed by the Manifest (or listed in another Manifest referenced directly or indirectly by the root Manifest) without having to validate these Content Objects using the signature.

A client device can obtain these Content Objects or Manifests by disseminating an Interest that includes the corresponding location-independent name. Then, when the client receives the Content Object or Manifest, the client can validate the Content Object's or Manifest's authenticity by computing it's hash value, and comparing its hash value to the ContentObjectHash value listed in the Manifest. For example, an Interest for a non-root Manifest or Content Object can have a name prefix that corresponds to the file and publisher, and uses the COH value as the name suffix:

/FileNamePrefix/chunk_COH  (1)

This way, if a chunk repeats elsewhere in the file, then each instance of the chunk will have the same COH value, and their corresponding Content Objects will have the same name and payload. The system can create a Content Object for the first instance of the chunk, and can use the same Content Object if the chunk is detected elsewhere in the file.

The name prefix in the Interest is used by CCN routers and forwarding nodes to forward the Interest toward the publisher or replica server, and the ContentObjectHash value is used by the publisher or replica server to match the Interest to decide which Content Object to return. The CCN routers perform lookup operations in the forwarding information base (FIB) using the Interest's name to determine which face to use to forward the Interest, and generate a pending Interest table (PIT) entry that maps the ContentObjectHash value to the face from which the Interest was received. Then, when the publisher or replica server returns the Content Objects, the CCN routers can determine how to return the nameless object based on its hash value.

Exemplary Content Producers and Consumers

FIG. 1 illustrates an exemplary network environment 100 that facilitates hosting a deduped collection of Content Objects that make up a file across a plurality of content-hosting services in accordance with an embodiment. By deduping a file into a Manifest hierarchy before publishing the file, content-hosting services 110 and 120 can use less space in their repositories to store the same file, and transmitting the file to a client device 114 over CCN will consume less network bandwidth.

Computing environment 100 can include a content centric network 102, which includes a plurality of edge nodes 104 and routing nodes 106 that can forward Interests based on their name or name prefix. Also, edge nodes 104 and routing nodes 106 can return Content Objects, which satisfy the Interest, based on the Content Object's name (for named Content Objects) or based on the Content Object's hash (for nameless Content Objects).

For example, network 102 can be managed by an Internet service provider (ISP), and can include an edge node 104.1 that provides network access to a plurality of client devices. Network 102 can also include edge nodes 104.2 and 104.3 that provide network access to a plurality of content-hosting services (e.g., directly or via a back-haul network) that can host or cache Content Objects for various content producers. A publisher 108 (e.g., a content producer) can store a collection of nameless Content Objects at a content-hosting service 110 (e.g., a content-delivery network or a replication server), as well as a content-hosting service 120. Alternatively content-hosting services 110 and/or 120 may each correspond to a promiscuous caching service run by the ISP, so that each caching service hosts nameless Content Objects using a different name prefix (e.g., a name prefix associated with a particular geographic location).

Note that content-hosting services 110 and 120 do not need to advertise a name prefix associated with the collection. Also, publisher 108 does not need to change a name prefix of the Content Objects to match a name prefix associated with content-hosting service 110 and/or 120, prior to providing the collection to content-hosting services 110 and 120. Rather, publisher 108 can generate a hierarchy of Manifests, such that the root Manifest can include name prefixes for a set of content-hosting services for the collection (e.g., services 110 and 120), as well as COH values for a set of nameless Content Objects (e.g., for other Manifests, or for the data objects in the collection).

Device 114 can request the collection by generating and disseminating an Interest that includes the collection's name, such as a name prefix associated with publisher 108, and a name suffix associated with the collection. When device 114 disseminates the Interest, edge nodes 104 and/or routing nodes 106 can forward the Interest to publisher 108, at which point publisher 108 can return the root Manifest to device 114. Alternatively, if a CCN node in network 102 (e.g., edge node 104.1) has cached the root Manifest, this CCN node can return the root Manifest to device 114 without having to forward the Interest to publisher 108.

Device 114 can use the root Manifest to select a content-hosting service 110 from which to request the individual nameless Content Objects of the collection, and uses the COH self-certifying names to generate a request for each nameless Content Object in the collection. For example, device 114 can generate an Interest that includes the name prefix to the selected content-hosting service, and that includes the COH self-certifying name for a respective nameless Content Object. Edge nodes 104 and/or routing nodes 106 can use the name prefix in the Interest's name to forward the Interest to the appropriate content-hosting service, and the content-hosting service can use the COH self-certifying name to select the nameless Content Object that needs to be returned to device 114.

Figures 2A, 2B:
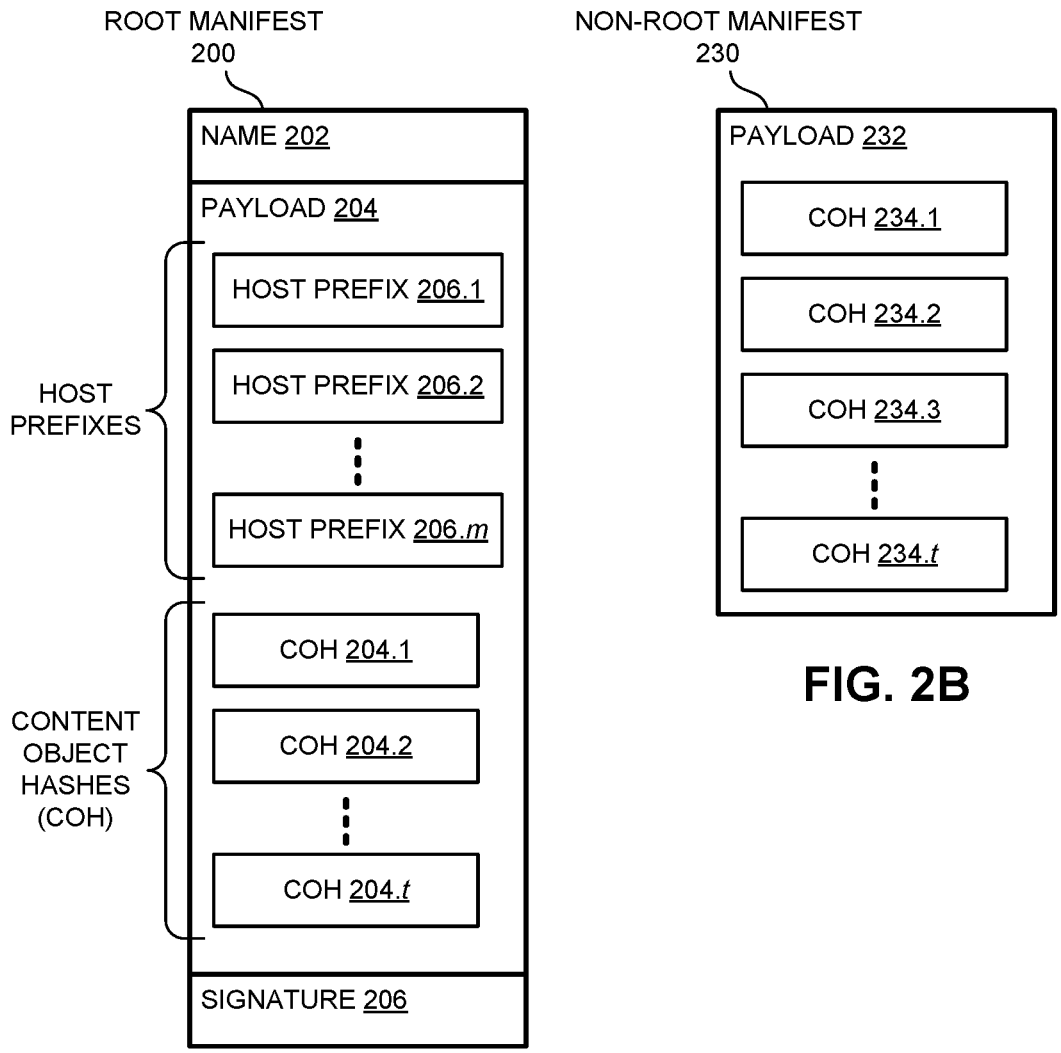
FIG. 2A illustrates an exemplary root manifest in accordance with an embodiment.
FIG. 2B illustrates an exemplary non-root manifest in accordance with an embodiment.

FIG. 2A illustrates an exemplary root manifest 200 in accordance with an embodiment. Specifically, root Manifest 200 can include a name 202, a payload 204, and a signature 206. Name 202 includes a name (or name prefix) for the collection. If the collection was generated by partitioning a large data object, name 202 includes the name for the data object from which the collection was generated. Also, signature 206 includes a cryptographic signature, generated based on name 202 and 204, and signed using the publisher's digital certificate.

Payload 204 of root Manifest 200 can include a set of host prefixes 206 that can be used to request the nameless Content Objects in the collection from a content-hosting service. The content-hosting service can host the partitioned Content Objects as well as the nameless non-root Manifests. Payload 204 can also include a set of COH values 204, which a content-hosting service can use to match against a nameless Content Object's hash value.

FIG. 2B illustrates an exemplary non-root manifest 230 in accordance with an embodiment. Specifically, non-root Manifest 230 can include a payload 232 that includes a set of COH values 204, which a content-hosting service can use to match against a nameless Content Object's hash value. In some embodiments, non-root Manifest 230 is a nameless Content Object which the content-hosting services can store along with the collection's other Content Objects. Hence, like any nameless Content Object, non-root Manifest 230 does not need to include a name or a signature.

Figure 3:
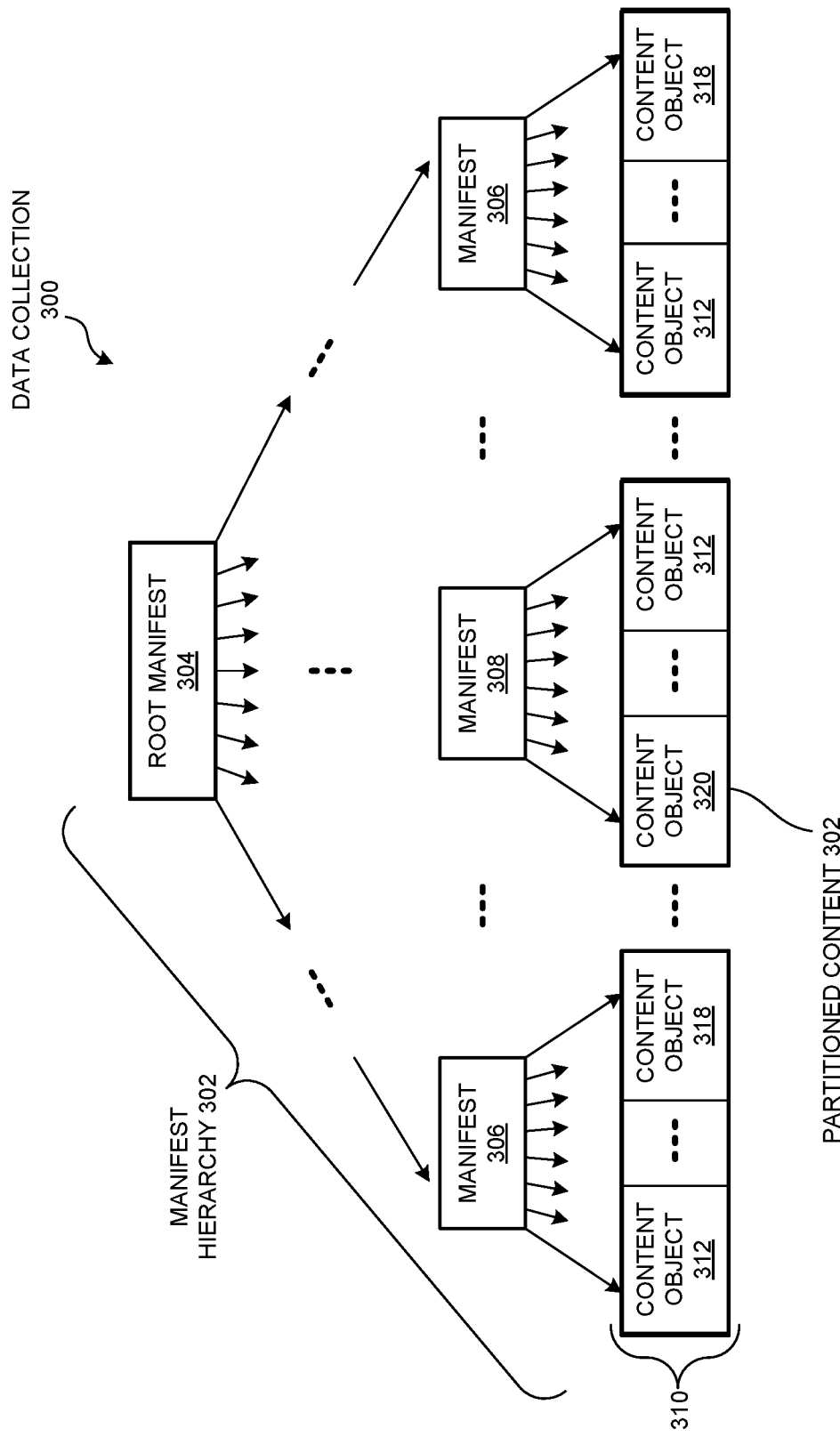
FIG. 3 illustrates an exemplary Manifest hierarchy for a data collection 300 in accordance with an embodiment.

FIG. 3 illustrates an exemplary Manifest hierarchy 302 for a data collection 300 in accordance with an embodiment. Specifically, a publisher can partition a data collection into n Content Objects 310 (e.g., nameless Content Objects), and can create a Manifest hierarchy 302 for the partitioned collection. Manifest hierarchy 302 can include one or more levels of Manifests, such that higher-level Manifests (e.g., the root Manifest) reference a next-level Manifest (e.g., Manifests 308) via its COH self-certifying name. The publisher can create a set of p Manifests for the n Content Objects 310. While Manifest hierarchy 302 depicts a complete tree, in practice, Manifest hierarchy can include any tree structure that maintains an in-order traversal order.

In some embodiments, the individual Manifests in Manifest hierarchy 302 may each include an arbitrary number of COH self-certifying names. For example, the publisher can create a set of p Manifests for the n Content Objects 310. If the publisher generates each Manifest to include COH self-certifying names for up to m nameless Content Objects (e.g., to limit the size of any given Manifest object), the publisher generates at least p=n/m Manifests that together include COH values for all n Content Objects 310.

One advantage of partitioning a file into a Manifest hierarchy using a data-based partitioning technique (as opposed to a fixed partitioning pattern) as described above is that it allows repeating data segments to be deduped when storing their Content Objects in the storage repository, regardless of their position in the file. For example, if a given Content Object appears multiple times in one or more Manifests (e.g., Content Object 312), this Content Object only needs to be stored once. This applies to both Content Objects as well as Manifests, given that a Manifest sub-hierarchy that appears multiple times in the overall Manifest hierarchy (e.g., Manifest 306) may only need to be stored once in the storage repository.

Figure 4A:
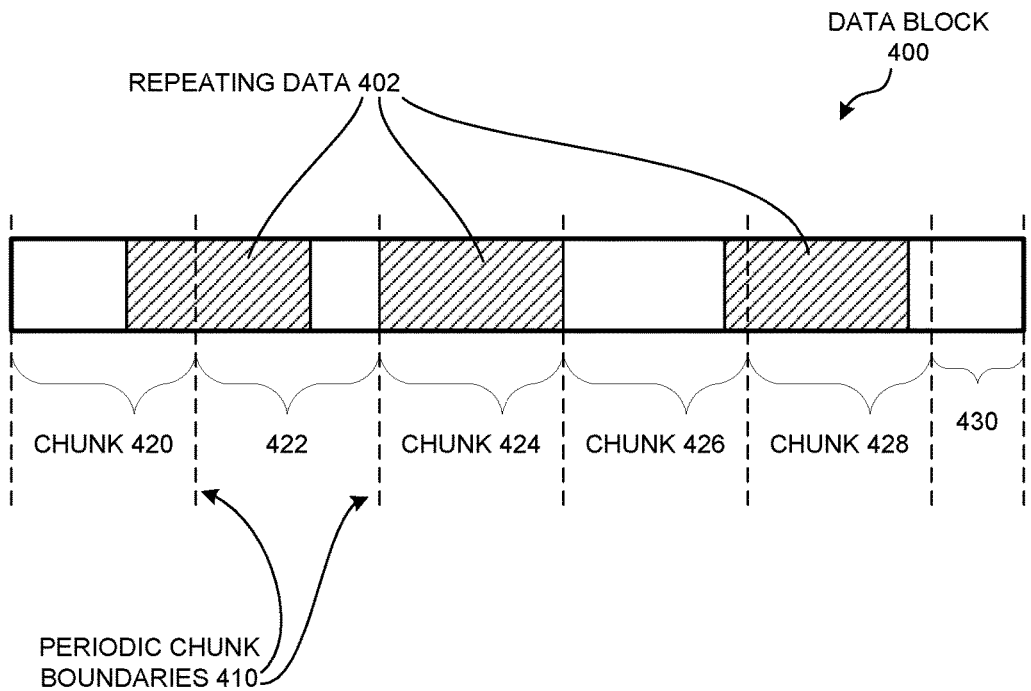
FIG. 4A illustrates an exemplary deduping outcome from a partitioning technique that partitions a data block at periodic chunk boundaries in accordance with an embodiment.

FIG. 4A illustrates an exemplary deduping outcome from a partitioning technique that partitions a data block 400 at periodic chunk boundaries 410 in accordance with an embodiment. Splitting the file at boundaries with fixed periods (e.g., a fixed partitioning pattern) causes the partitioned chunks to have a fixed size. However, this fixed size for chunks 420-430 and the fixed-period for chunk boundaries 410 would cause different instances of repeating data 402 to start at different offsets from chunk boundaries 410. This would not allow the system to detect the repeating instances of data 402, and would not dedupe data 402 or any other repeating pattern that has a non-uniform period.

Figure 4B:
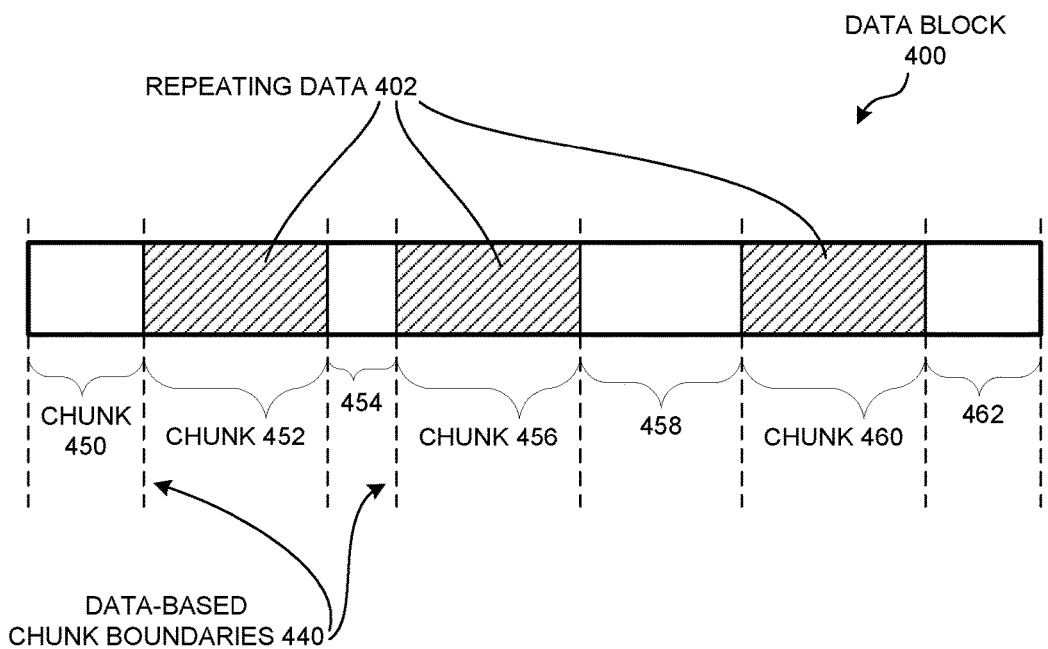
FIG. 4B illustrates an exemplary deduping outcome from a partitioning technique that partitions a data block at data-based chunk boundaries in accordance with an embodiment.

FIG. 4B illustrates an exemplary deduping outcome from a partitioning technique that partitions a data block 400 at data-based chunk boundaries 440 in accordance with an embodiment. Data-based chunk boundaries 440 become aligned with repeating bit-patterns that have non-uniform periods across the file, or whose uniform repetition period is not a multiple of a predetermined target (uniform) chunk size. Generating chunks 450-462 from the portions of data block 400 between chunk boundaries 440 can produce chunks 452, 456, and 460 that contain the same data (e.g., repeating data 402). The system can dedupe repeating data 402 by generating and storing one Content Object (or one Manifest sub-hierarchy) for one instance of repeating data 402 (e.g., for chunk 452), and not having to generate and store additional objects for chunks 456 and 460.

Data-Partitioning Process

Figure 5:
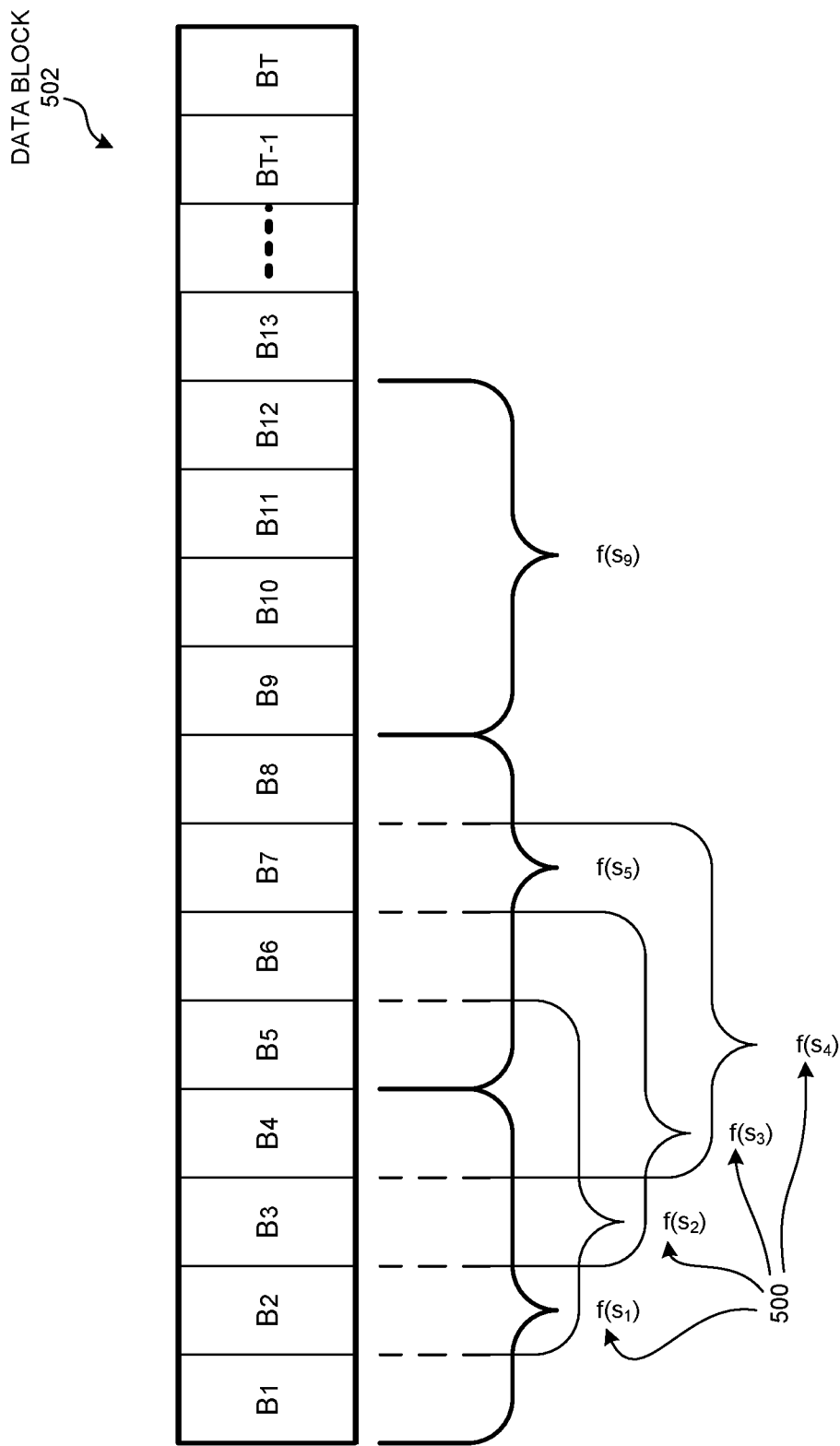
FIG. 5 illustrates a partitioning function in accordance with an embodiment.

FIG. 5 illustrates a partitioning function 500 in accordance with an embodiment. Partitioning function 500 can be any probabilistic function that splits a file 502 into approximately a predetermined number of file segments (e.g., into file segments of approximately a predetermined size). Partitioning function 500 can detect file locations where a give pattern exists, regardless of their location within file 502.

In some embodiments, partitioning function 500 can be common across different computers to allow these computers to use the same chunk boundaries when partitioning a file. Using a common partitioning function can also allow different computers to partition different files in a way that can isolate common chunks from the different files. This can allow a data repository to dedupe a large collection of different files that have an overlap in content, such as images embedded in multiple documents, common binary code in multiple programs, and text sequences or metadata that appear in multiple files.

A computer system can partition file 502 into chunks based on chunk boundaries identified by partitioning function 500. A simple partition function may analyze file 502 to identify all locations that include a predetermined bit-pattern, and labels these locations as chunk boundaries. For example, given that a byte of data can have any of 256 possible values, it is expected that searching for locations that include the pattern "0x00" may identify a set of chunk boundaries that has an average period of 256 bytes. Increasing (or decreasing) the length of the search pattern to n bits will produce chunk boundaries with a larger (or lower) average period of $2^n$ bytes.

In another approach, partitioning function 500 can compute a running hash (e.g., at one-byte intervals, or one-bit intervals) across a segment of file 502 (e.g., across bytes {B2, B3, B4, B5} for segment $s_2$). The output of partitioning function 500 may be a byte, or may be a multi-byte value. The system can compare the outputs of partitioning function 502 computed for each segment to a predetermined bit pattern 504 that is expected to occur at the desired repetition period. For the segments with a matching pattern, the system can use the starting byte of the corresponding segment s to identify the start of a chunk that is to be partitioned from file 500. For example, partitioning function 500 can be:

$$f(s_i)=[h(s_i) \cap M] \text{xor } P \quad (1)$$

In equation (1), the partitioning function $f$ takes an m-byte sequence $s_i$ as input, and computes a value that indicates the start of a given chunk when the output has a zero value.

Recall that the system can control the average partition-boundary period produced by partitioning function 500 by comparing the n least significant bits (LSBs) of the hash h(s) to a predetermined bit pattern. The system can do this by generating a mask M that includes all zeros leading up to the n LSBs, and includes all ones at the n LSBs. The system also generates a pattern P that includes all zeros leading up to the pre-determined boundary-indicating pattern at the n LSBs of P. The system can then perform a bitwise AND computation between the hash h(s) and mask M, and can perform a bitwise exclusive-OR computation against pattern P. The partitioning function will produce a bit pattern with a string of zero values when the n LSBs of the hash h(s) matches the predetermined bit pattern, which indicates the start of the partitioning point.

The system can identify the start of each chunk from each matching event by determining the byte offset for the start of the n consecutive bytes that were fed into partitioning function 500. The bytes that make up a given chunk start at the corresponding byte offset, and end before the byte offset for the next chunk. The start and end of the file are also chunk boundaries.

In some embodiments, the parameters used by the deduping function can be based on the file's name or namespace. For example, the parameters may be obtained from the file's location independent name itself (e.g., from a component of an HSVLI name), or can be derived from the file's name or namespace. Alternatively, the parameters for the deduping can be obtained from metadata associated with the file or the file's name. The function parameters can include, for example, boundary-indicating pattern P for a given level in the Manifest hierarchy, and a number of bits in the boundary-indicating pattern (used to generate mask M). These variations for obtaining the deduping function's parameters can allow different publishers to use unique deduping techniques, while allowing any computer that dedupes the file to repeat the deduping process in the same way for that file.

Deduping Process

In some embodiments, the system can generate the Manifest hierarchy using a top-down approach in a way that limits the number of entries per Manifest, and results in chunk sizes that can fit in a Content Object. For example, the system may first partition the file into a set of chunks that will correspond to the root Manifest's COH values, and then repeatedly partitions each chunk into a number of sub-chunks that fit into other Manifests, until the chunks are sufficiently small to fit in Content Objects.

The non-root Manifests may themselves be nameless objects, and are referenced by their COH value. This allows a COH value of a given chunk to match a COH value of the chunk's Manifest after the chunk is itself partitioned into a set of sub-chunks that are referenced by the chunk's Manifest. For example, if a chunk is greater than a predetermined maximum Content Object size (e.g., 4 KB), it is possible for deduping to be performed on the chunk without having to modify the Manifests that include a COH reference to this chunk.

Figure 6:
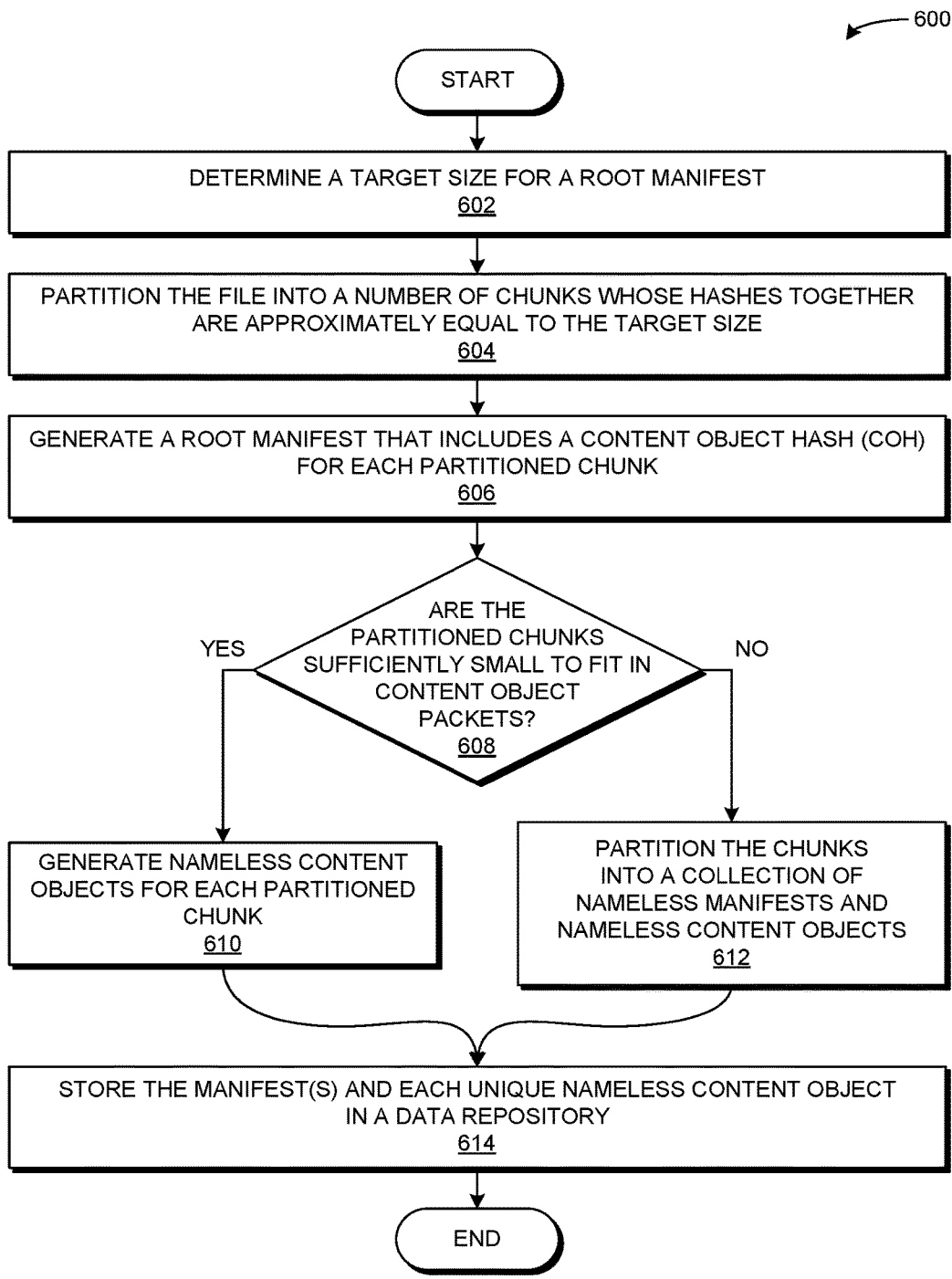
FIG. 6 presents a flow chart illustrating a method for deduping a file while partitioning the file into a root Manifest, set of non-root Manifests, and a set of nameless Content Objects in accordance with an embodiment.

FIG. 6 presents a flow chart illustrating a method 600 for deduping a file while partitioning the file into a root Manifest, set of non-root Manifests, and a set of nameless Content Objects in accordance with an embodiment. During operation, the computer system can determine a target size for a root Manifest (operation 602). The system may partition the file into a number of chunks whose COH values together are approximately equal to the target size (operation 604), and can generate a root Manifest that includes a COH for each partitioned chunk (operation 606).

The system may then determine whether the partitioned chunks are sufficiently small to fit in Content Object packets (operation 608). If so, the system may generate nameless Content Objects for each partitioned chunk (operation 610). Otherwise, the system may partition the chunks into a collection of nameless Manifests and nameless Content Objects (operation 612).

The system may then store the Manifest(s) and each unique nameless Content Object in a data repository (operation 614). Recall that the nameless Manifests and nameless Content Objects are stored and accessed from a repository based on their COH values, and not based on a name that is unique to the object. Because of this, if a nameless Manifest or nameless Content Object exists multiple times in the Manifest hierarchy, data deduping is effectively performed by the act of referencing them in Manifests by their COH values and storing them in a repository by their COH values. The nameless Manifests and Content Objects are only stored once in the repository, regardless of how many times they occur in the Manifest hierarchy.

Also, if a given nameless Manifest or nameless Content Object occurs in multiple files, the system will not need to store this nameless object in the repository once again. This effectively achieves data deduping across multiple files.

In some embodiments, CCN Content Objects can have a payload with a maximum size of 64 KB. Hence, the function should be chosen that generates chunks that are less than 64

KB, and a Content Object can be generated for each chunk. The Content Objects can be named based on a hash of the chunk's contents. Also, the Content Objects can be listed in a Manifest, in the order that their corresponding chunks occurred within the file, and gives the Manifest a name that corresponds to the file. Note that generating the Manifest in this way automatically dedupes the file by representing the chunks with their COH values, which allows a computer store or transmit each Content Object only once regardless of how many times the corresponding chunk occurred in the original file.

At each partitioning step, the system can determine the size that each sub-chunk needs to be in order to partition a file or chunk into the target number of sub-chunks. The system can then select or generate a partitioning function that can identify bit patterns that occur at a period approximately equal to the target chunk size. Using this function, the system can identify bit patterns that indicate a starting point for each partition, and partitions the file or chunk into sub-chunks along these starting points.

For example, if a file is 1 TB in size, the system may generate the root Manifest to have approximately 612 entries by partitioning the file at approximately 2 GB intervals. To do this, the system may generate a mask M and pattern P that compare the last 30 bits of the each running hash value when used in the partitioning function:

$$f(s)=[h(s_i) \cap M] \text{xor } P$$

Then, to generate the next level of Manifests, the system may partition the file at approximately 8 MB intervals to generate smaller Manifests with approximately 256 entries. The system may generate 8 MB chunks by generating a mask M and pattern P that compares the last 23 bits of the each running hash value.

The system may generate a third level of Manifests to reference the actual nameless Content Objects that make up the 1 TB file by partitioning the 8 MB chunks at approximately 4 KB intervals. The system can generating a mask M and pattern P that compares the last 12 bits of the each running hash value to generate the 4 KB chunks. The third-level Manifests may each include approximately 2048 entries, and may each be approximately 2 KB in size.

This process for generating Manifests results in chunks that start at key byte patterns of the file that have been designated as the start of a chunk, which may exist anywhere in the file and not necessarily at fixed intervals. This increases the likelihood that two generated Content Objects may have the same content, given that matching Content Objects no longer need to start at fixed intervals.

Figure 7:
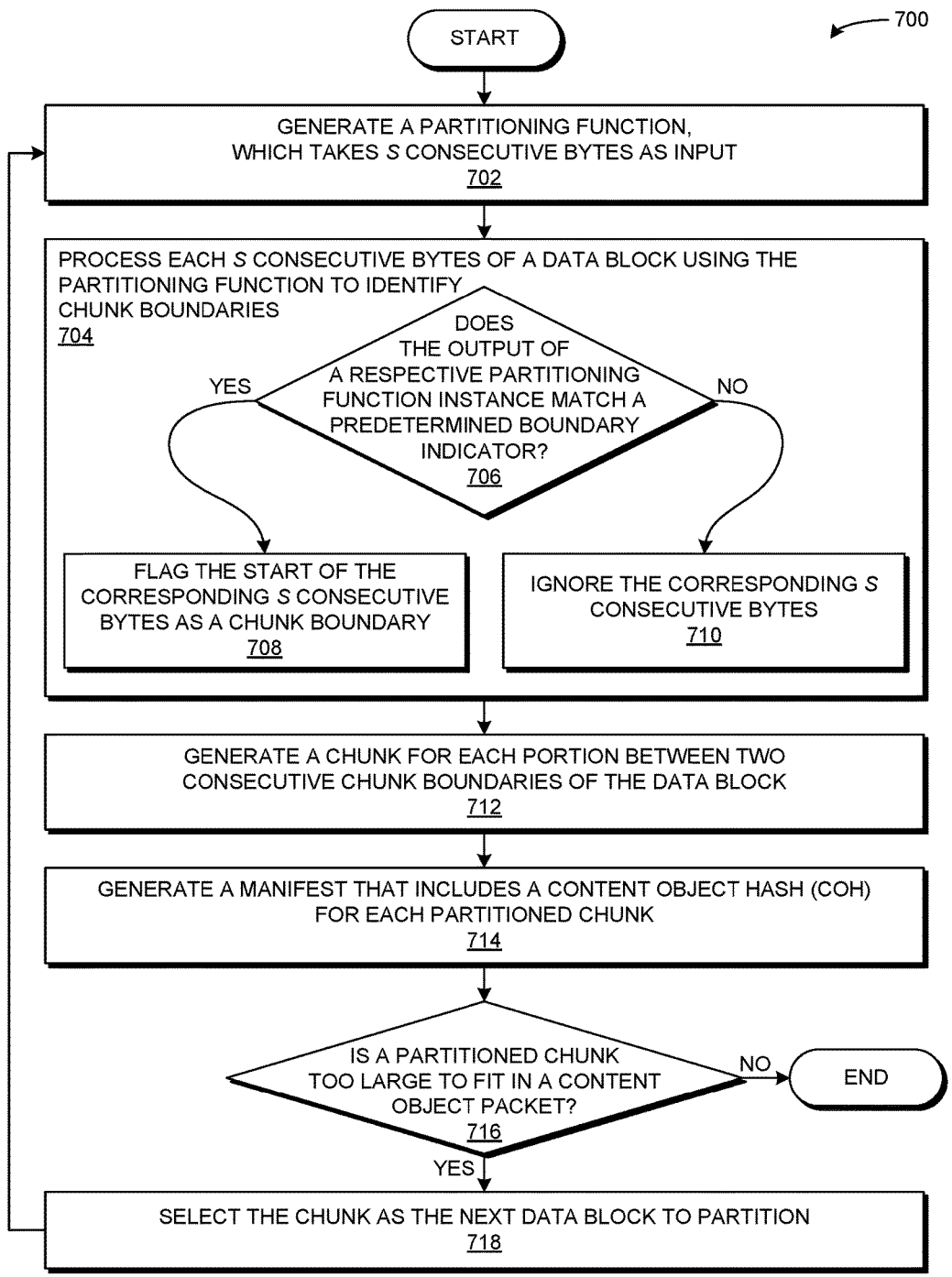
FIG. 7 presents a flow chart illustrating a method for generating a Manifest hierarchy while iterative partitioning a file during the deduping process in accordance with an embodiment.

FIG. 7 presents a flow chart illustrating a method 700 for generating a Manifest hierarchy while iterative partitioning a file during the deduping process in accordance with an embodiment. During operation, a computer system can generate a partitioning function, which takes m consecutive bytes as input (operation 702). The system can process each m consecutive bytes of the data block using the partitioning function to identify a set of chunk boundaries (operation 704). These chunk boundaries are aligned with a predetermined bit pattern, which may not have a fixed period but result in chunks that are approximately equal to a given target chunk size. The system can perform operation 704 to process each m consecutive bytes sequentially, in parallel, or a combination of sequential and parallel operations.

In some embodiments, at each step of operation 704, the system can determine whether the output of the respective partitioning function instance matches a predetermined boundary indicator (operation 706). If so, the system can flag the start of the corresponding m consecutive bytes as a chunk boundary (operation 708). Otherwise, the system can ignore the corresponding m consecutive bytes (operation 710).

The system can generate a chunk for each portion between two consecutive chunk boundaries of the data block (operation 712), and generates a Manifest that includes a COH for each partitioned chunk (operation 714).

The system can generate a Manifest that includes a COH for each partitioned chunk (operation 714), and determines whether a respective partitioned chunk is too large to fit in a Content Object packet (operation 716). If so, the system can select the chunks that are too large as the next data blocks to partition (operation 718), and returns to operation 702 to generate a Manifest hierarchy for each of these selected chunks. Once the system has a set of chunks that are smaller than a predetermined threshold size (e.g., sufficiently small for nameless Content Objects), the system can generate and store a nameless Content Object for each of these partitioned chunks (e.g., during operation 610 of FIG. 6).

In some embodiments, after generating a given chunk during operation 712, the system may search the repository for a nameless Manifest or nameless Content Object whose COH value matches that of the each chunk. If a match is found for a given chunk, the system may avoid processing the chunk (e.g., by not generate a Content Object during operation 610 of FIG. 6, and not partitioning the chunk during further iterations of operations 702-718). Ignoring a chunk that already exists in a storage repository effectively dedupes the file during the partitioning process, which prevents the computer system from performing additional processing steps that would generate a Manifest sub-hierarchy that already exists in the repository.

Modifying a Stored Manifest Hierarchy from a Repository

In some embodiments, given that the chunks do not occur at fixed byte intervals, the system can modify a file to add or remove data without having to generate a completely new Manifest hierarchy. For example, a computer system may maintain a Manifest hierarchy to implement a self-deduping filesystem. If the system needs to add or remove a file from the filesystem (or add or remove a segment from a file), the system can determine which Manifest will be affected by the change, and can generate another Manifest that replaces this modified Manifest.

The system can replace a reference to the modified Manifest (e.g., by modifying its parent Manifest) so that it references the new Manifest, and can repeat this process across the parent Manifests up to the root Manifest. The other Manifests and nameless Content Objects that are not affected by the change to the filesystem (or file) can be left alone, even if the change affects their chunk's offset relative to the start of the filesystem or file.

Figure 8:
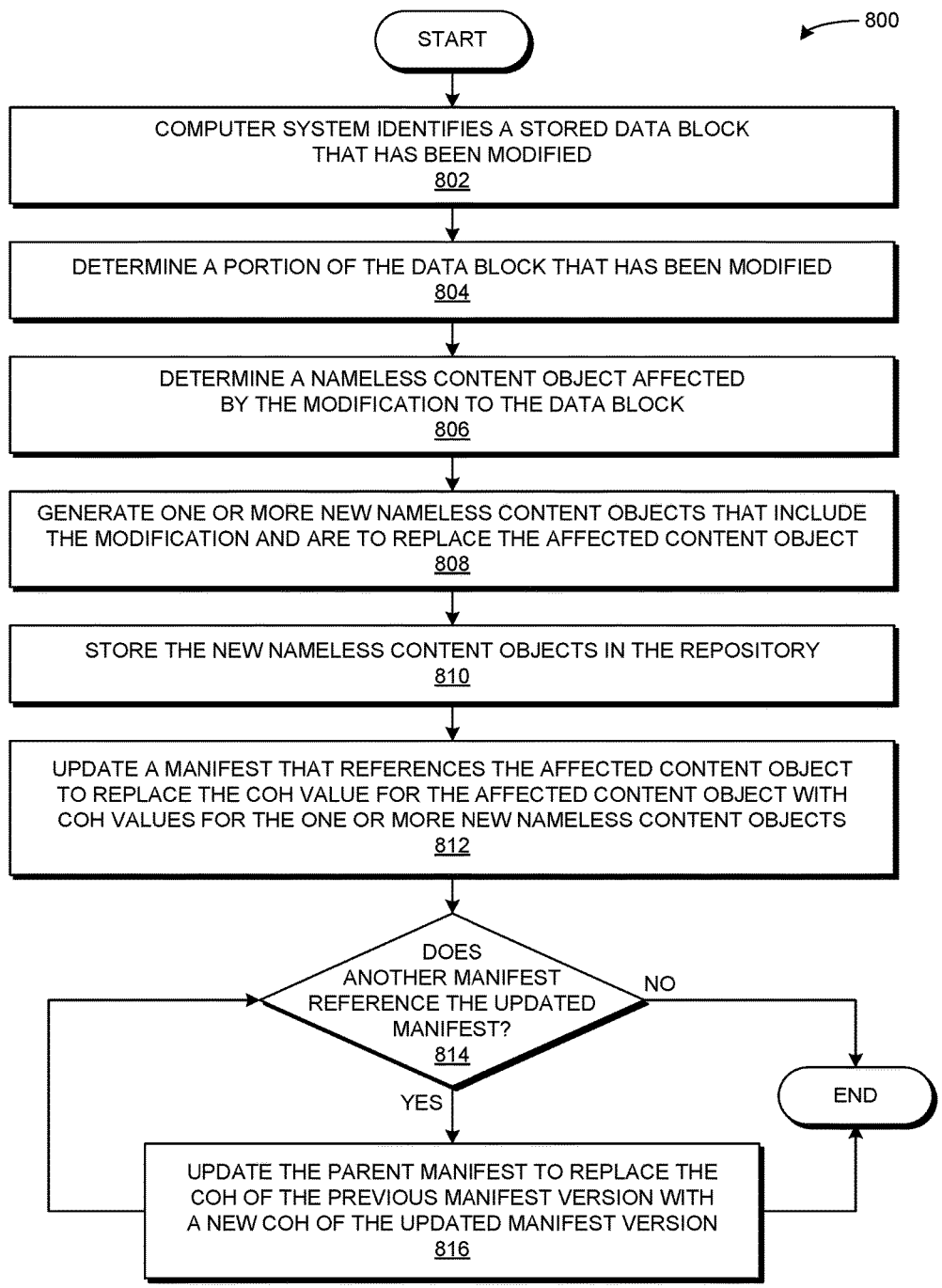
FIG. 8 presents a flow chart illustrating a method for modifying a Manifest hierarchy stored in a repository in accordance with an embodiment.

FIG. 8 presents a flow chart illustrating a method 800 for modifying a Manifest hierarchy stored in a repository in accordance with an embodiment. During operation, the system can identify a stored data block that has been modified, and needs to be updated in the stored Manifest hierarchy (operation 802). The data block may be a file, a block of data in a database, or a block of data in a storage device. The system can then determine a portion of the data block that has been modified (operation 804), and determines a nameless Content Object that is affected by the modification to the data block (operation 806).

The system then generates one or more new nameless Content Object(s) that include the modification and are to replace the affected Content Object (operation 808), and stores the new nameless Content Object(s) in the repository (operation 810). The system may then update a Manifest that references the affected Content Object, to replace the COH value for the affected Content Object with COH value(s) for the one or more new nameless Content Object(s) (operation 812).

The system can then update the Manifest hierarchy's COH values that correspond to the modified portion of the file to reference the new nameless Content Objects. This allows the system to undo data deduping across the Manifest entries that correspond to the modification, while preserving data deduping across all other instances of the original Content Object.

For example, the system can propagate the changes up the Manifest hierarchy toward the root Manifest by determining whether another Manifest references the updated Manifest (operation 814). If so, the system can update the parent Manifest to replace the COH value that corresponds to the modification with a new COH value of the updated Manifest (operation 816). The system can repeat operations 814-816 until the system updates the root Manifest.

Figure 9:
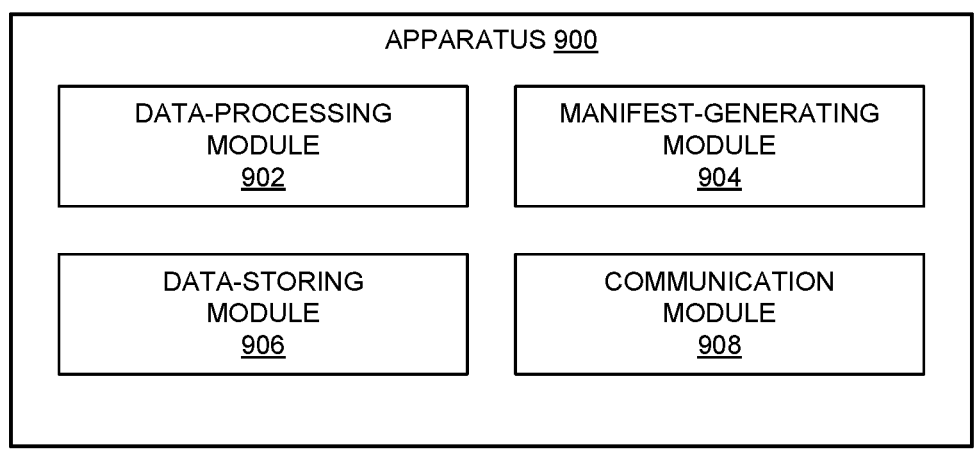
FIG. 9 illustrates an exemplary apparatus that facilitates deduping repeating segments of a data block when generating or modifying a Manifest hierarchy for the data block in accordance with an embodiment.

FIG. 9 illustrates an exemplary apparatus 900 that facilitates deduping repeating segments of a data block when generating or modifying a Manifest hierarchy for the data block in accordance with an embodiment. Apparatus 900 can comprise a plurality of modules which may communicate with one another via a wired or wireless communication channel. Apparatus 900 may be realized using one or more integrated circuits, and may include fewer or more modules than those shown in FIG. 9. Further, apparatus 900 may be integrated in a computer system, or realized as a separate device which is capable of communicating with other computer systems and/or devices. Specifically, apparatus 900 can comprise a data-partitioning module 902, a Manifest-generating module 904, a data-storing module 906, and a communication module 908.

In some embodiments, data-partitioning module 902 can select a partitioning function that identifies a pattern that is expected to occur a predetermined number of times within a data block, and processes a plurality of segments of the data block, using the partitioning function, to identify a set of chunk boundaries. Data-partitioning module 902 can also generate a chunk for each portion of the data block between two consecutive chunk boundaries. Manifest-generating module 904 can generate a Manifest that includes a Content Object Hash (COH) value for each partitioned chunk.

Data-storing module 906 can store the Manifest and the unique partitioned chunks in a storage repository, wherein two partitioned chunks with a common COH value are stored once in the storage repository. Communication module 908 can receive Interest messages that include a namespace associated with the file or a publisher of the file, include a COH value for a Manifest or nameless Content Object for the file. In response to validating the Manifest, communication module 908 can return a Manifest or nameless Content Object whose hash matches the COH in the Interest.

Figure 10:
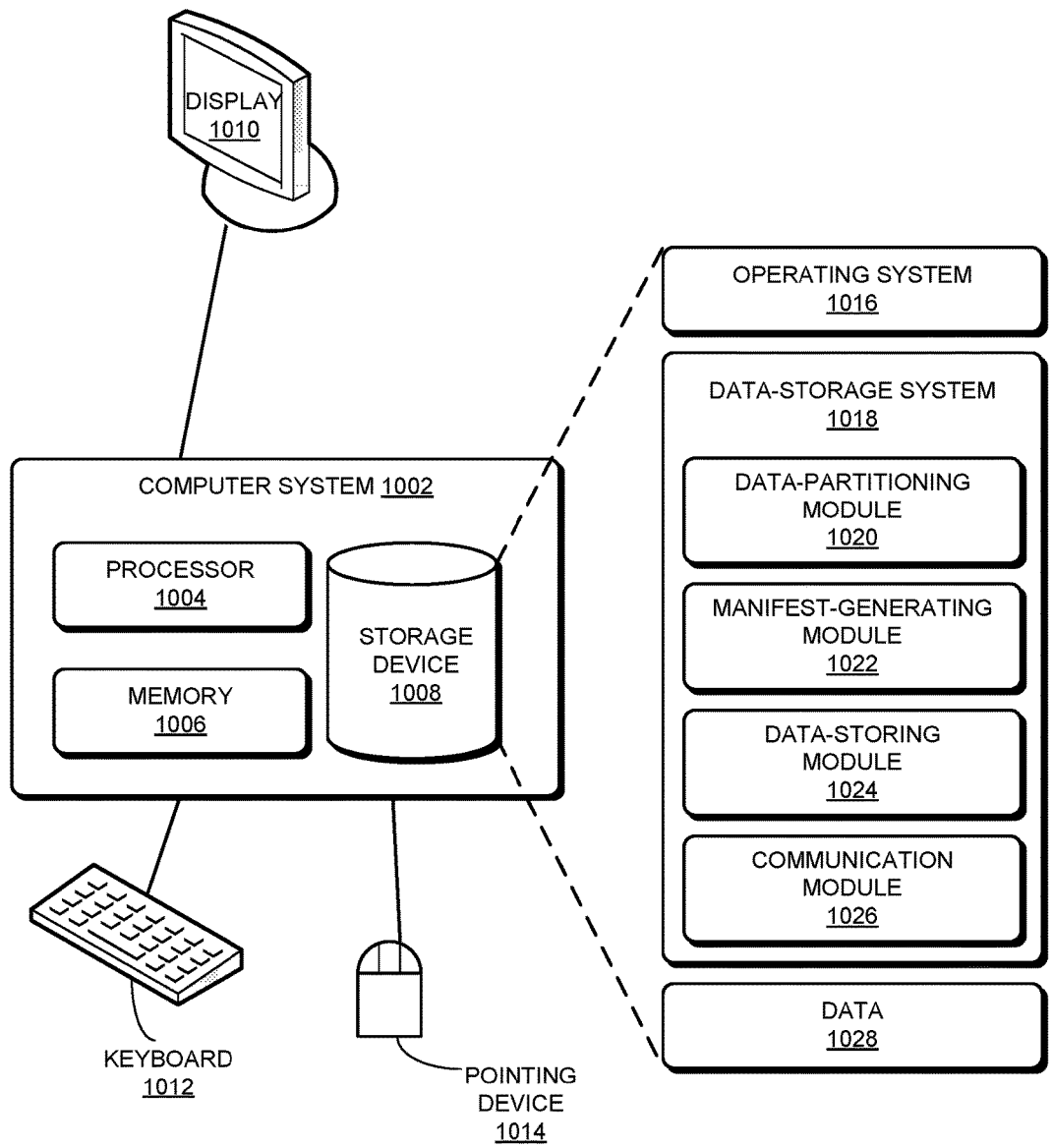
FIG. 10 illustrates an exemplary computer system that facilitates deduping repeating segments of a data block when generating or modifying a Manifest hierarchy for the data block in accordance with an embodiment.

FIG. 10 illustrates an exemplary computer system 1002 that facilitates deduping repeating segments of a data block when generating or modifying a Manifest hierarchy for the data block in accordance with an embodiment. Computer system 1002 includes a processor 1004, a memory 1006, and a storage device 1008. Memory 1006 can include a volatile memory (e.g., RAM) that serves as a managed memory, and can be used to store one or more memory pools. Furthermore, computer system 1002 can be coupled to a display device 1010, a keyboard 1012, and a pointing device 1014. Storage device 1008 can store operating system 1016, data-storage system 1018, and data 1028.

Data-storage system 1018 can include instructions, which when executed by computer system 1002, can cause computer system 1002 to perform methods and/or processes described in this disclosure. Specifically, data-storage system 1018 may include instructions for selecting a partitioning function that identifies a pattern that is expected to occur a predetermined number of times within a data block, and processes a plurality of segments of the data block, using the partitioning function, to identify a set of chunk boundaries (data-partitioning module 1020). These instructions also generate a chunk for each portion of the data block between two consecutive chunk boundaries. Further, data-storage system 1018 can include instructions for generating a Manifest that includes a Content Object Hash (COH) value for each partitioned chunk (Manifest-generating module 1022).

Data-storage system 1018 can also include instructions for storing the Manifest and the unique partitioned chunks in a storage repository, wherein two partitioned chunks with a common COH value are stored once in the storage repository (data-storing module 1024). Moreover, data-storage system 1018 can include instructions for receiving an Interest message that includes a namespace associated with the file or a publisher of the file, and include a COH value for a Manifest or nameless Content Object for the file (communication module 1026). If the Interest references a valid Manifest or nameless Content Object, these instructions can cause computer system 1002 to return a Manifest or nameless Content Object whose hash matches the COH in the Interest.

Data 1028 can include any data that is required as input or that is generated as output by the methods and/or processes described in this disclosure. Specifically, data 1026 can store at least a Manifest hierarchy that corresponds to a file or a filesystem. The Manifest hierarchy can include a root Manifest and a set of nameless Content Objects. In some embodiments, the Manifest hierarchy can also include a set of nameless Manifests (e.g., non-root Manifests) that are referenced by a parent Manifest (e.g., the root Manifest), and themselves reference other non-root Manifests or nameless Content Objects.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
   selecting, by a computer system, a partitioning function that identifies a pattern that is expected to occur a predetermined number of times within a data block, wherein the data block corresponds to a file in a filesystem;
   processing a plurality of segments of the data block, using the partitioning function, to identify a set of chunk boundaries, wherein the partitioning function takes as input a segment $s_i$ consisting of m consecutive bytes, wherein segment $s_i$ starts at the $i^{th}$ byte of the data block;
   generating a chunk for each portion of the data block between two consecutive chunk boundaries;
   generating one or more Manifests, wherein each Manifest includes a Content Object Hash (COH) value for each partitioned chunk;
   storing, by the computer system, each Manifest and the corresponding partitioned chunk in a storage repository, wherein two partitioned chunks with a common COH value are stored once in the storage repository; and
   determining that the file in the filesystem has been modified, and in response, the computer-implemented method further comprising:
      determining a portion of the file that has been modified;
      determining a nameless Content Object affected by the modification to the file based on the COH value;
      generating one or more new nameless Content Objects that include the modification to the file and are to replace the affected Content Object;
      storing the one or more nameless Content Objects in the storage repository; and
      updating, in one or more Manifests of a Manifest hierarchy, COH values corresponding to the modified portion of the file to replace the affected Content Object with the new nameless Content Objects, at the modified portion of the file, to achieve data deduping across multiple files.

2. The computer-implemented method of claim 1, wherein identifying the chunk boundaries involves:
   processing a respective segment $s_i$ to obtain an n-bit identifier which has an expected repetition period in the data block approximately equal to a target chunk size; and
   determining whether the n-bit pattern matches a predetermined boundary indicator.

3. The computer-implemented method of claim 2, wherein processing the segment $s_i$ involves applying a mask M to segment $s_i$ to mask all but the n least significant bits of segment $s_i$.

4. The computer-implemented method of claim 2, wherein processing the segment $s_i$ involves computing a hash value $h(s_i)$, and obtaining the last n bits of the computed hash value.

5. The computer-implemented method of claim 1, wherein storing a respective chunk in the storage repository involves:
   upon determining that the respective chunk is smaller than or equal to a predetermined size:
      generating a nameless Content Object that includes the respective chunk; and
      storing the nameless Content Object in the data repository, if the nameless Content Object does not exist in the data repository.

6. The computer-implemented method of claim 1, wherein storing a respective chunk in the storage repository involves:
   upon determining that the respective chunk is larger than a predetermined size:
      selecting a second partitioning function that identifies a second pattern that is expected to occur a second predetermined number of times within the chunk;
      using the second partitioning function to partition the chunk into a collection of sub-chunks;
      generating a second Manifest that includes a Content Object Hash (COH) value for each partitioned sub-chunk; and
      storing the second Manifest and the unique sub-chunks that do not exist in the storage repository.

7. The computer-implemented of claim 1, wherein the Manifest hierarchy includes a root Manifest; and
   wherein the computer-implemented method comprises repeating the step of updating the COH values corresponding to the modified portion of the file in the one or more Manifests until the root Manifest is updated.

8. A non-transitory computer-readable storage medium storing instructions that when executed by a computer cause the computer to perform a method, the method comprising:
   selecting a partitioning function that identifies a pattern that is expected to occur a predetermined number of times within a data block, wherein the data block corresponds to a file in a filesystem;
   processing a plurality of segments of the data block, using the partitioning function, to identify a set of chunk boundaries, wherein the partitioning function takes as input a segment $s_i$ consisting of m consecutive bytes, wherein segment $s_i$ starts at the $i^{th}$ byte of the data block;
   generating a chunk for each portion of the data block between two consecutive chunk boundaries;
   generating one or more Manifests, wherein each Manifest includes a Content Object Hash (COH) value for each partitioned chunk;
   storing each Manifest and the corresponding partitioned chunk in a storage repository, wherein two partitioned chunks with a common COH value are stored once in the storage repository; and
   determining that the file in the filesystem has been modified, and in response, the method further comprising:
      determining a portion of the file that has been modified;
      determining a nameless Content Object affected by the modification to the file based on the COH value;
      generating one or more new nameless Content Objects that include the modification to the file and are to replace the affected Content Object;
      storing the one or more nameless Content Objects in the storage repository; and
      updating, in one or more Manifests of a Manifest hierarchy, COH values corresponding to the modified portion of the file to replace the affected Content Object with the new nameless Content Objects, at the modified portion of the file, to achieve data deduping across multiple files.

9. The non-transitory computer-readable storage medium of claim 8, wherein identifying the chunk boundaries involves:
processing a respective segment $s_i$ to obtain an n-bit identifier which has an expected repetition period in the data block approximately equal to a target chunk size; and
determining whether the n-bit pattern matches a predetermined boundary indicator.

10. The non-transitory computer-readable storage medium of claim 9, wherein processing the segment $s_i$ involves applying a mask M to segment $s_i$ to mask all but the n least significant bits of segment $s_i$.

11. The non-transitory computer-readable storage medium of claim 9, wherein processing the segment $s_i$ involves computing a hash value $h(s_i)$ and obtaining the last n bits of the computed hash value.

12. The non-transitory computer-readable storage medium of claim 8, wherein storing a respective chunk in the storage repository involves:
upon determining that the respective chunk is smaller than or equal to a predetermined size:
generating a nameless Content Object that includes the respective chunk; and
storing the nameless Content Object in the data repository, if the nameless Content Object does not exist in the data repository.

13. The non-transitory computer-readable storage medium of claim 8, wherein storing a respective chunk in the storage repository involves:
upon determining that the respective chunk is larger than a predetermined size:
selecting a second partitioning function that identifies a second pattern that is expected to occur a second predetermined number of times within the chunk;
using the second partitioning function to partition the chunk into a collection of sub-chunks;
generating a second Manifest that includes a Content Object Hash (COH) value for each partitioned sub-chunk; and
storing the second Manifest and the unique sub-chunks that do not exist in the storage repository.

14. The non-transitory computer-readable storage medium of claim 8, wherein the Manifest hierarchy includes a root Manifest; and
wherein the method comprises repeating the step of updating the COH values corresponding to the modified portion of the file in the one or more Manifests until the root Manifest is updated.

15. A computer system, comprising:
a processor;
a memory storing instructions that when executed by the processor cause the computer system to:
select a partitioning function that identifies a pattern that is expected to occur a predetermined number of times within a data block, wherein the data block corresponds to a file in a filesystem;
process a plurality of segments of the data block, using the partitioning function, to identify a set of chunk boundaries, wherein the partitioning function takes as input a segment $s_i$ consisting of m consecutive bytes, wherein segment $s_i$ starts at the $i^{th}$ byte of the data block;
generate a chunk for each portion of the data block between two consecutive chunk boundaries;
generate one or more Manifests, wherein each Manifest includes a Content Object Hash (COH) value for each partitioned chunk;
store each Manifest and the corresponding partitioned chunk in a storage repository, wherein two partitioned chunks with a common COH value are stored once in the storage repository; and
determining that the file in the filesystem has been modified, and in response, the instructions further cause the computer system to:
determine a portion of the file that has been modified;
determine a nameless Content Object affected by the modification to the file based on the COH value;
generate one or more new nameless Content Objects that include the modification to the file and are to replace the affected Content Object;
store the one or more nameless Content Objects in the storage repository; and
update, in one or more Manifests of a Manifest hierarchy, COH values corresponding to the modified portion of the file to replace the affected Content Object with the new nameless Content Objects, at the modified portion of the file, to achieve data deduping across multiple files.

16. The computer system of claim 15, wherein identifying the chunk boundaries involves:
processing a respective segment $s_i$ to obtain an n-bit identifier which has an expected repetition period in the data block approximately equal to a target chunk size; and
determining whether the n-bit pattern matches a predetermined boundary indicator.

17. The computer system of claim 16, wherein processing the segment $s_i$ involves applying a mask M to segment $s_i$ to mask all but the n least significant bits of segment $s_i$.

18. The computer system of claim 16, wherein processing the segment $s_i$ involves computing a hash value $h(s_i)$ and obtaining the last n bits of the computed hash value.

19. The computer system of claim 15, wherein storing a respective chunk in the storage repository involves:
upon determining that the respective chunk is smaller than or equal to a predetermined size:
generating a nameless Content Object that includes the respective chunk; and
storing the nameless Content Object in the data repository, if the nameless Content Object does not exist in the data repository.

20. The computer system of claim 15, wherein storing a respective chunk in the storage repository involves:
upon determining that the respective chunk is larger than a predetermined size:
selecting a second partitioning function that identifies a second pattern that is expected to occur a second predetermined number of times within the chunk;
using the second partitioning function to partition the chunk into a collection of sub-chunks;
generating a second Manifest that includes a Content Object Hash (COH) value for each partitioned sub-chunk; and
storing the second Manifest and the unique sub-chunks that do not exist in the storage repository.

\* \* \* \* \*